(12) United States Patent
Al-Khowaiter et al.

(10) Patent No.: US 11,236,517 B2
(45) Date of Patent: Feb. 1, 2022

(54) CEMENTITIOUS PRINT HEAD, 3D PRINTING ARCHITECTURE, AND CEMENTITIOUS PRINTING METHODOLOGY

(71) Applicant: Saudi Arabian Oil Company, Dhahran (SA)

(72) Inventors: Ahmad O. Al-Khowaiter, Dhahran (SA); Aqil Jamal, Dhahran (SA); Issam T. Amr, Khobar (SA); Rami Bamagain, Khobar (SA); Ali Shakir Al-Hunaidy, Dhahran (SA); Bandar A. Fadhel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 216 days.

(21) Appl. No.: 16/724,790

(22) Filed: Dec. 23, 2019

(65) Prior Publication Data

US 2021/0189745 A1  Jun. 24, 2021

(51) Int. Cl.
*E04G 21/04* (2006.01)
*B33Y 10/00* (2015.01)
(Continued)

(52) U.S. Cl.
CPC .............. *E04G 21/04* (2013.01); *B33Y 10/00* (2014.12); *B33Y 30/00* (2014.12); *B33Y 50/02* (2014.12); *E04B 1/16* (2013.01)

(58) Field of Classification Search
CPC ......... E04G 21/04; B33Y 10/00; B33Y 30/00; B33Y 50/02; E04B 1/16
See application file for complete search history.

(56) References Cited

U.S. PATENT DOCUMENTS

| | | | | |
|---|---|---|---|---|
| 3,238,279 A | * | 3/1966 | Tarlton | ................ C04B 40/0263 264/82 |
| 5,935,317 A | * | 8/1999 | Soroushian | ......... C04B 40/0231 106/723 |

(Continued)

FOREIGN PATENT DOCUMENTS

| | | |
|---|---|---|
| CN | 207465455 U | 6/2018 |
| CN | 109822713 A | 5/2019 |

(Continued)

OTHER PUBLICATIONS

Greguric, "Concrete 3D Printing: How it Works & Applications", https://all3dp.com/2/concrete-3d-printing-how-to-do-it-and-application/, Aug. 23, 2018.

(Continued)

*Primary Examiner* — Yung-Sheng M Tsui
(74) *Attorney, Agent, or Firm* — Dinsmore & Shohl LLP

(57) ABSTRACT

A cementitious print head and a cementitious printing methodology may include a feed barrel, a print head nozzle, a $CO_2$ supply, a steam supply, a selective valve assembly in communication with the $CO_2$ supply and the steam supply, a plurality of dual use extrusion head injectors, and a print head controller. The print head controller is operatively coupled to the selective valve assembly and is programmed to execute a $CO_2$ and steam injection protocol where steam may be selected for injection by the extrusion head injectors into a cementitious composition as it is extruded from the print head nozzle to enhance a hydration reaction and formation of hydroxide in the cementitious composition before $CO_2$ may be selected for injection by the extrusion head injectors into the cementitious composition as it is extruded from the print head nozzle to enhance a carbonation reaction in the cementitious composition.

21 Claims, 3 Drawing Sheets

(51) Int. Cl.
*B33Y 30/00* (2015.01)
*B33Y 50/02* (2015.01)
*E04B 1/16* (2006.01)

(56) References Cited

U.S. PATENT DOCUMENTS

| | | | |
|---|---|---|---|
| 8,845,940 B2* | 9/2014 | Niven | B28B 11/245 |
| | | | 264/82 |
| 10,071,422 B2 | 9/2018 | Buller et al. | |
| 2014/0116295 A1* | 5/2014 | Niven | B28B 13/023 |
| | | | 106/638 |
| 2014/0252668 A1 | 9/2014 | Austin et al. | |
| 2014/0322083 A1* | 10/2014 | Kuppler | F27B 5/04 |
| | | | 422/109 |
| 2015/0069656 A1 | 3/2015 | Bowers et al. | |
| 2017/0036372 A1 | 2/2017 | Sandberg et al. | |
| 2018/0037514 A1 | 2/2018 | Chowdhury et al. | |
| 2019/0194074 A1* | 6/2019 | Amr | C04B 40/0263 |
| 2020/0368937 A1* | 11/2020 | Jamal | C04B 40/024 |

FOREIGN PATENT DOCUMENTS

| | | | | |
|---|---|---|---|---|
| GB | 1337014 A | * | 11/1973 | ......... C04B 40/0231 |
| KR | 101543307 B1 | * | 8/2015 | |
| KR | 20160031578 A | | 3/2016 | |

OTHER PUBLICATIONS

Hager et al., "3D printing of buildings and building components as the future of sustainable construction?", Procedia Engineering, vol. 151, pp. 292-299, 2016.

Ma et al., "State-of-the-art of 3D printing technology of cementitious material—An emerging technique for construction", Science China Technological Sciences, vol. 61, No. 4, pp. 475-495, Apr. 2018.

Sakin et al., "3D Printing of Buildings: Construction of the Sustainable Houses of the Future by BIM", Science Direct, Procedia Engineering, Energy Procedia, vol. 134, pp. 702-722, 2017.

International Search Report and Written Opinion dated Mar. 22, 2021 pertaining to International application No. PCT/US2020/065030 filed Dec. 15, 2020, 16 pgs.

* cited by examiner

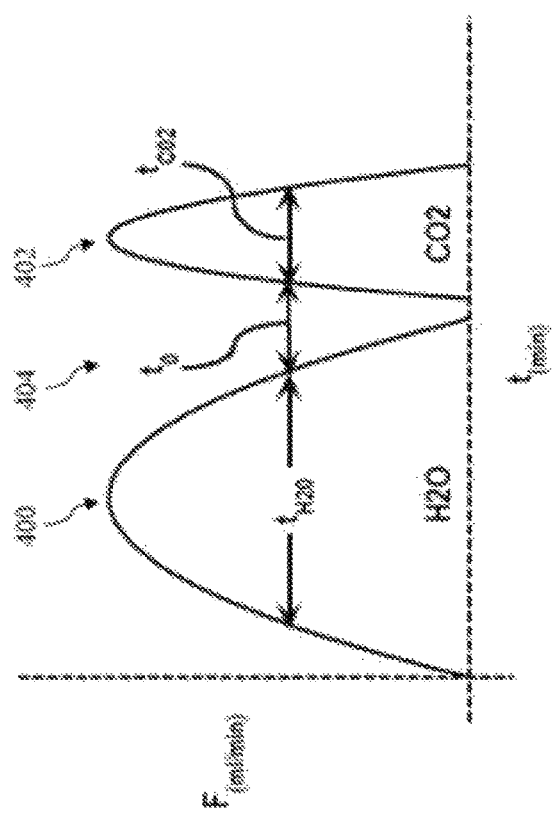
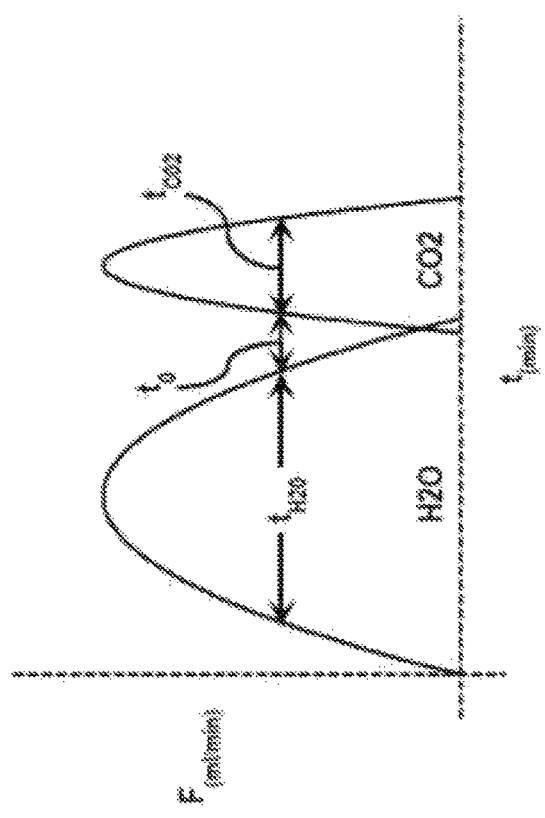
FIG. 4
FIG. 5

CEMENTITIOUS PRINT HEAD, 3D PRINTING ARCHITECTURE, AND CEMENTITIOUS PRINTING METHODOLOGY

BACKGROUND

The present disclosure relates to three-dimensional (3D) printing of cementitious materials for architectural and other types of additive printing.

BRIEF SUMMARY

Cementitious print heads may be used to extrude and 3D print cementitious compositions. The extrusion nozzle of the print head may move along a pre-programmed path and may continually extrude cementitious materials for 3D printing. The print head can be installed on a gantry or other type of support structure, to freely move in the X, Y and Z directions. For example, fresh concrete can be delivered to the print head with the use of a pump and supplemental pumping can be used to deliver material smoothly to the printing nozzle of the print head. Concrete suitable for 3D printing can be extruded from the nozzle to continually trace out the cross section of the structural components to be printed. It is contemplated that 3D concrete printing systems within the scope of the present disclosure may additionally include a mixing pump and additive material supplies, and may alternatively utilize a multi-axis robotic arm instead of the aforementioned gantry, or any other conventional or yet to be developed print head positioning and support structure. Print speeds of 0.1 m/s, or greater, and print beds 9.0 m×4.5 m×3.0 m, or larger, are contemplated.

Cementitious compositions suitable for 3D printing are relatively fast setting and are characterized by relatively low slump because the extruded material is unsupported after leaving the extrusion nozzle. Suitable materials may comprise a cement binder, an aggregate, and water. The cement binder may include, but is not limited to, one or more than one of tricalcium silicate ($Ca_3SiO_5$ or $3CaO.SiO_2$), dicalcium silicate ($Ca_2SiO_4$ or $2CaO.SiO_2$), tricalcium aluminate ($Ca_3Al_2O_6$ or $3CaO.Al_2O_3.Fe_2O_3$), tetracalcium aluminoferrite ($Ca_4Al_2Fe_2O_{10}$ or $4CaO.Al_2O_3.Fe_2O_3$), gypsum ($CaSO_4.2H_2O$), other cement binders, or combinations of these. The aggregate may take a variety of forms including, for example, materials ranging from fine particles of sand to relatively large, course rocks. The aggregate may include ultra-light aggregate, light weight aggregate, normal weight aggregate, and heavyweight aggregate. Ultra-light weight aggregate may include, but is not limited to, vermiculite, ceramics spheres and perlite. Light weight aggregate may include, but is not limited to, expanded clay, shale or slate, or crushed brick. Normal weight aggregate may include, but is not limited to, crushed limestone, sand, river gravel, or crushed concrete. Heavyweight aggregate may include, but is not limited to steel or iron shot, or steel or iron pellets. The water in the cementitious composition may include water from any suitable source, such as but not limited to municipal water, ground water, treated or untreated salt water, treated wastewater, treated produced water, well water, or other sources of water. The cementitious composition may also include other additives, such as polymers, colorants, detergents, retardants, accelerants, minerals, other additives, or combinations of these.

In accordance with one embodiment of the present disclosure, a print head for extruding a cementitious composition comprises a feed barrel, a print head nozzle, a $CO_2$ supply, a steam supply, a selective valve assembly in communication with the $CO_2$ supply and the steam supply, a plurality of dual use extrusion head injectors, and a print head controller. The feed barrel is oriented and shaped to receive a cementitious composition and to direct the cementitious composition to the print head nozzle. The selective valve assembly communicatively couples the $CO_2$ supply and the steam supply to the dual use extrusion head injectors for the selective injection of $CO_2$ and steam from individual ones of the extrusion head injectors. The plurality of dual use extrusion head injectors are positioned downstream of the print head nozzle for selective injection of $CO_2$ and steam into a cementitious composition extruded from the print head nozzle. The print head controller is operatively coupled to the selective valve assembly and is programmed to execute a $CO_2$ and steam injection protocol where steam may be exclusively selected for injection by the extrusion head injectors into a cementitious composition as it is extruded from the print head nozzle to enhance a hydration reaction and formation of hydroxide in the cementitious composition before $CO_2$ may be exclusively selected for injection by the extrusion head injectors into the cementitious composition as it is extruded from the print head nozzle to enhance a carbonation reaction in the cementitious composition.

In accordance with another embodiment of the present disclosure, a 3D printing architecture is provided comprising a 3D print head positioning framework and a print head.

In accordance with another embodiment of the present disclosure, a print head for extruding a cementitious composition comprises a feed barrel, a print head nozzle, a $CO_2$ supply, a steam supply, a selective valve assembly in communication with the $CO_2$ supply and the steam supply, and a plurality of dual use extrusion head injectors. The feed barrel is oriented and shaped to receive a cementitious composition and to direct the cementitious composition to the print head nozzle. The selective valve assembly communicatively couples the $CO_2$ supply and the steam supply to the dual use extrusion head injectors for the selective injection of $CO_2$ and steam from individual ones of the extrusion head injectors. Each of the plurality of dual use extrusion head injectors are coupled to the $CO_2$ supply and the steam supply by the selective valve assembly and are positioned to selectively inject $CO_2$ and steam into the cementitious composition downstream of the print head nozzle. The dual use extrusion head injectors may be positioned to selectively inject $CO_2$ and steam into the cementitious composition from positions that at least partially surround an extruded column of cementitious composition.

In accordance with yet another embodiment of the present disclosure, a print head for extruding a cementitious composition comprises a feed barrel, a print head nozzle, a $CO_2$ supply, a steam supply, a selective valve assembly in communication with the $CO_2$ supply and the steam supply, a plurality of extrusion head injectors, and a print head controller.

In accordance with another embodiment of the present disclosure, a method of extruding a cementitious composition from a print head is provided.

Although the concepts of the present disclosure are described herein with primary reference to the particular printing architecture illustrated in FIGS. 1 and 2, it is contemplated that the concepts will enjoy applicability to any of a variety of conventional or yet to be developed printing architectures, some examples of which are discussed herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 4 and 5 are graphical depictions of $CO_2$ and steam flow rates in the extrusion head ejector according to one or more embodiments of the present disclosure.

DETAILED DESCRIPTION

Figure 2:
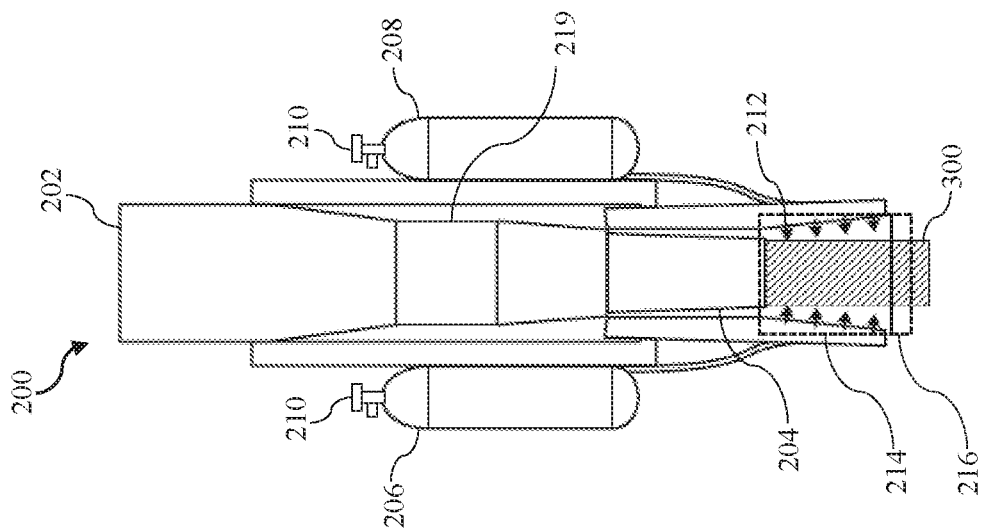
FIG. 2 is a schematic illustration of a print head according to one embodiment of the present disclosure.
Figure 1:
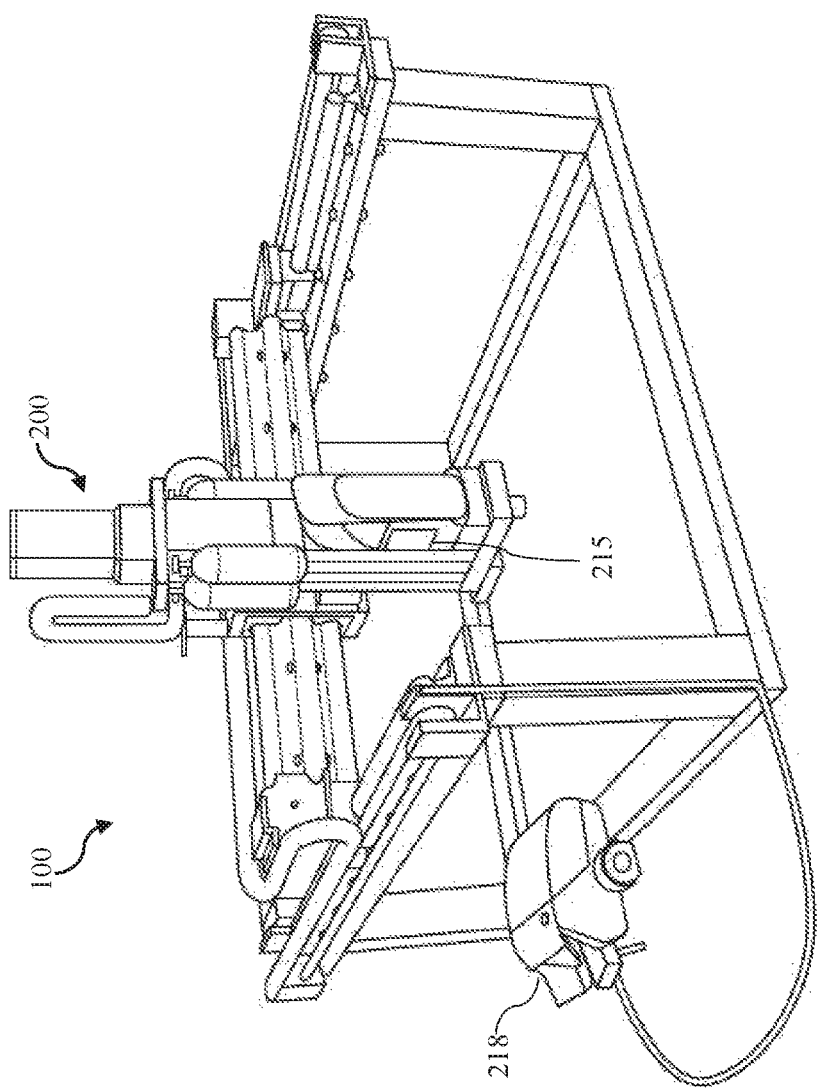
FIG. 1 is a schematic illustration of a 3D printing architecture comprised according to one embodiment of the present disclosure.

FIGS. 1 and 2 illustrate a 3D printing architecture comprising a 3D print head positioning framework 100 and a print head 200 for extruding a cementitious composition 300. The print head 200 comprises a feed barrel 202, a print head nozzle 204, a $CO_2$ supply 206, a steam supply 208, a selective valve assembly comprising independent valves 210 in communication with the $CO_2$ supply 206 and the steam supply 208, a plurality of dual use extrusion head injectors 212, and a print head controller 215.

The feed barrel 202 may be oriented and shaped to receive a cementitious composition 300 and to direct the cementitious composition 300 to the print head nozzle 204. The valves 210 of the selective valve assembly communicatively couple the $CO_2$ supply 206 and the steam supply 208 to the dual use extrusion head injectors 212 for the selective injection of $CO_2$ and steam from individual ones of the extrusion head injectors 212. The plurality of dual use extrusion head injectors 212 are positioned downstream of the print head nozzle 204 for selective injection of $CO_2$ and steam into a cementitious composition 300 extruded from the print head nozzle 204. As will be appreciated by those practicing the concepts of the present disclosure, reference herein to a component being "downstream" relative to another component refers to the direction of the flow of cementitious material in the 3D printing architecture of the present disclosure, and indicates that cementitious material moving through the architecture would reach the "downstream" component after a preceding component in the 3D printing architecture. For example, the print head nozzle 204 is clearly "downstream" of the feed barrel 202 in FIG. 2 because cementitious material cannot travel from the print head pump 218 to the print head nozzle 204 without traveling through the feed barrel 202.

Figure 3:
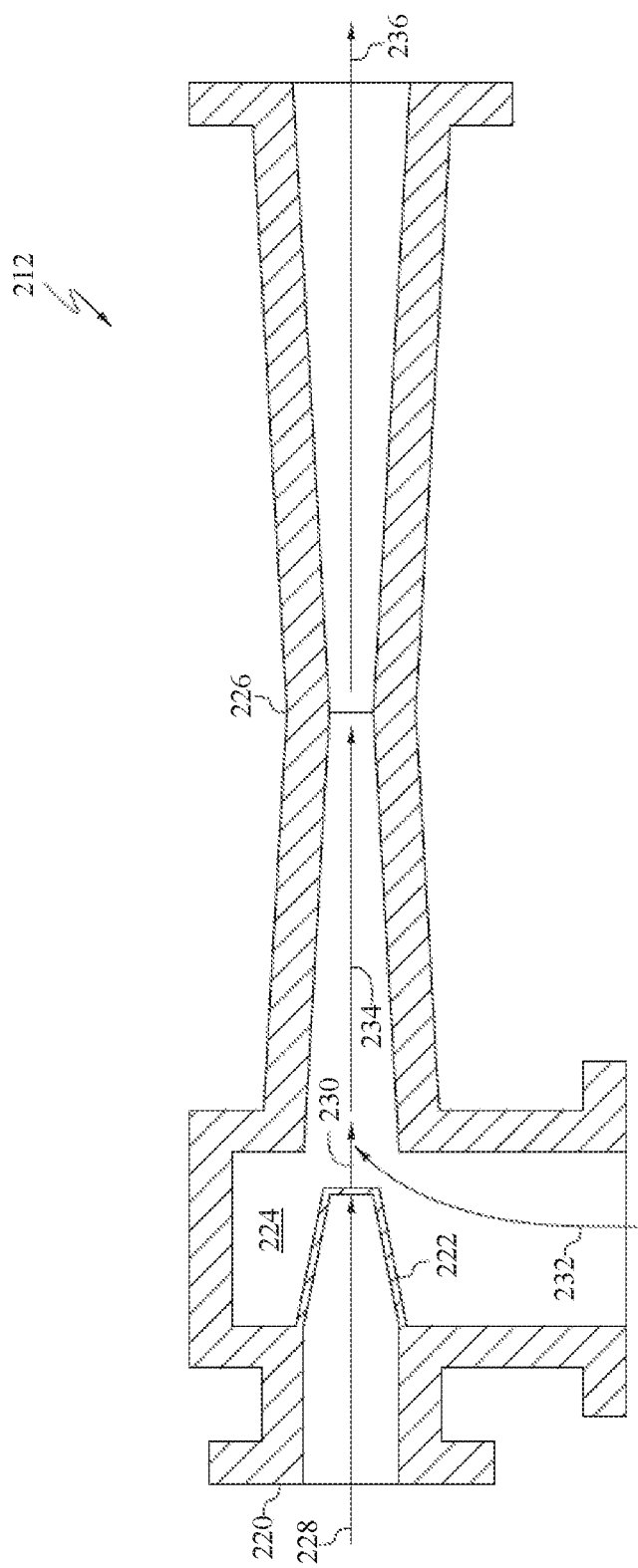
FIG. 3 is a schematic illustration of an extrusion head ejector according to one embodiment of the present disclosure.

The extrusion head injectors 212 may take any of a variety of conventional or yet to be developed forms without departing from the scope of the present disclosure. Referring to FIG. 3, for example, the extrusion head injectors 212 may include a steam inlet 220 in fluid communication with the steam supply 208 (FIG. 2), a nozzle 222, a vacuum chamber 224 in fluid communication with the $CO_2$ supply 206 (FIG. 2), and a diffuser 226. A greater-pressure steam 228 may be passed from the steam supply 208, through the inlet 220, and to the nozzle 222. Referring still to FIG. 3, the pressure of the greater-pressure steam 228 may cause the greater-pressure steam 228 to pass through a convergent portion of the nozzle 222. The passing of the greater-pressure steam 228 through the convergent portion of the nozzle 222 may convert the pressure of the greater pressure steam 228 into velocity to produce a greater-velocity steam 230. As used in the present disclosure, the term "greater-velocity" may refer to a gas velocity greater than the gas velocity of the greater-pressure steam 228 entering the extrusion head ejector 212. As the greater-pressure steam 228 passes through the nozzle 222, the pressure decreases and the gas velocity increases.

The greater-velocity steam 230 may pass from the nozzle 222 into the internal volume of the vacuum chamber 224. The decrease in pressure and increase in velocity of the greater velocity steam 230 at the outlet of the nozzle 222 may produce a vacuum within the internal volume of the vacuum chamber 224 through the Venturi effect. Similarly, a $CO_2$-comprising stream 232 may be passed from the $CO_2$ supply 206 into the internal volume of the vacuum chamber 224. The greater-pressure stream 234 may pass through the diffuser 226 and may increase the gas velocity and decrease the pressure to produce the outlet stream 236.

Again referring to FIGS. 1 and 2, in some embodiments, the print head may further comprise a dual use extrusion head injector cover. The extrusion head injector cover 214 may be placed around the plurality of dual use extrusion head injectors 212 to help minimize the loss of injected steam and $CO_2$ to the atmosphere. Further, a screed bar 216 may be positioned downstream of the print head nozzle 204 to assist in smoothing and forming the cementitious composition 300.

Still referring to FIGS. 1 and 2, the print head controller 215 is operatively coupled to the valves 210 of the selective valve assembly and is programmed to execute a $CO_2$ and steam injection protocol where steam is exclusively selected for injection by the extrusion head injectors 212 into a cementitious composition 300 as it is extruded from the print head nozzle 204. The injection of steam in this manner enhances a hydration reaction and the formation of hydroxide in the cementitious composition 300. Steam is selected for injection before $CO_2$, which is also exclusively selected for injection by the extrusion head injectors 212 into the cementitious composition 300 as it is extruded from the print head nozzle 204. The injection of $CO_2$ enhances a carbonation reaction in the cementitious composition 300. The extruded cementitious composition 300 and the $CO_2$ and steam injection protocol can be advantageously configured such that the extruded cementitious composition 300 is self-supporting at NTP. An extruded cementitious composition 300 can be said to be "self-supporting" at NTP if it maintains at least 95% of its dimensional integrity following extrusion and deposition. For the purposes of the present disclosure, it is noted that normal temperature and pressure (NTP) denotes temperature and pressure conditions at a temperature of 20° C. and an absolute pressure of 1 atm.

The print head controller 215 may be programmed to execute the $CO_2$ and steam injection protocol to establish an alternating and repeating sequence of steam and $CO_2$ injection into the cementitious composition 300. The alternating and repeating sequence of steam and $CO_2$ injection into the cementitious composition 300 may comprise periods of steam injection in the sequence that are larger than periods of $CO_2$ injection in the sequence, at approximately equal steam and $CO_2$ flow rates.

The periods of steam injection may be between approximately 3 and approximately 5 times larger than the periods of $CO_2$ injection. For example, the periods of steam injection may be approximately 2.0 minutes, whereas the periods of CO$_2$ injection may be approximately 0.5 minutes. Further, the periods of steam injection may be approximately 2.0 minutes, at a flow rate of approximately 10 ml/min, and the periods of CO$_2$ injection may be approximately 0.5 minutes, at a flow rate of approximately 10 ml/min. The periods of steam injection and the periods of CO$_2$ injection may be characterized by approximately equal flow rates. The respective injection pressures can be at or above 1 atm, and the respective temperatures of the injected steam and CO$_2$ can approximate the temperatures of commercially available supplies of such fluids, i.e., at or slightly above room temperature, for the injected CO$_2$, and at a relatively elevated temperature, e.g., 60° C., for the injected steam.

Now referring to FIGS. 4 and 5, the alternating and repeating sequence of steam injection 400 and CO$_2$ injection 402 may be described as comprising a series of injection-free periods 404 of duration t$_0$ in the alternating and repeating sequence of steam injection 400 and CO$_2$ injection 402. It should be noted that in some embodiments, the alternating and repeating sequence of steam injection 400 and CO$_2$ injection 402 may slightly overlap as one injection is finishing and the other is beginning (See FIG. 5). In some embodiments, the duration of individual ones of the injection-free periods 404 is between approximately 0 sec and approximately 20 sec, at FWHM. In other embodiments, the duration of individual ones of the injection-free periods 404 is less than approximately 10 sec, at FWHM.

The alternating and repeating sequence of steam injection 400 and CO$_2$ injection 402 comprises a series of steam injection 400 periods of duration two, a series of CO$_2$ injection 402 periods of duration $t_{CO2}$, and a series of injection-free periods 404 of duration $t_0$, satisfying the following relations at full width at half maximum (FWHM):

$t_{H2O} \geq t_{CO2} \geq t_0$;

0 sec $\leq t_{H2O} \leq$ 180 sec;

0 sec $\leq t_{CO2} \leq$ 60 sec; and 0 sec $\leq t_0 \leq$ 20 sec.

Again referring to FIGS. 1 and 2, the dual use extrusion head injectors 212 are positioned to selectively inject CO$_2$ and steam into the cementitious composition 300 downstream of the print head nozzle 204. The dual use extrusion head injectors 212 may be positioned to selectively inject CO$_2$ and steam from positions that at least partially surround an extruded column of cementitious composition 300.

The print head controller 215 may take any of a variety of conventional or yet to be developed forms of programmable controllers, may comprise a single or multiple controllers, and is configured to communicate with and control the valves 210 of the selective valve assembly according to its programmed injection protocol. The print head controller 215 may also be programmed to cooperate with the 3D print head positioning framework 100 to control the 3D position of the print head nozzle 204.

Selective valve assemblies contemplated by the present disclosure may comprise independent valve assembly components 210 that are dedicated to respective ones of the CO$_2$ supply 206 and the steam supply 208, as is illustrated in FIGS. 1 and 2, or an integrated valve assembly unit in communication with the CO$_2$ supply 206 and the steam supply 208. Suitable selective valve assemblies may take any of a variety of conventional or yet to be developed valve assembly configurations including, for example, individual valves and valve actuators dedicated to each of the CO$_2$ supply 206 and steam supply 208, or an integrated valve assembly unit in communication with the CO$_2$ supply 206 and steam supply 208.

Still referring to FIGS. 1 and 2, the CO$_2$ supply 206 and the steam supply 208 may comprise pressurized gas containers, pressurized supply lines, or a combination thereof. The feed barrel 202 may be oriented and shaped to direct the cementitious composition 300 to the print head nozzle 204 at least partially under the force of gravity. The print head 200 may comprise a supplemental extrusion pump 219 arranged to force the cementitious composition 300 in the feed barrel 202 to the print head nozzle 204.

As is illustrated in FIG. 1, the print head 200 may be mounted to the 3D positioning framework 100 for 3D movement of the print head nozzle. The 3D print head positioning framework 100 may take any of a variety of conventional or yet to be developed forms. In one embodiment, the 3D print head positioning framework 100 may be comprised of a number of rails supported by a number of pillars, wherein the rails and pillars support conduit to hold and manipulate the print head 200. The 3D printing architecture may further comprise a source of cementitious material in communication with the feed barrel 202 of the print head 200.

In some embodiments, the cement supply may be sourced into the print head pump 218 and routed through conduits supported on the rails and pillars of the 3D print head positioning framework 100. It should be noted the source may take any of a variety of conventional forms, including, but not limited to a cement mixer, a concrete mixer, a concrete truck, or a cement truck, or yet to be developed forms.

Additional embodiments are contemplated where the print head of the 3D printing architecture does not utilize a print head controller, in which case the selective injection of steam and CO$_2$ would be controlled in some other manner, i.e., either manually or with some other type of controller. Still further embodiments are contemplated where the extrusion head injectors described above are not dual use extrusion head injectors, in which case separate injectors would need to be provided for separate injection of steam and CO$_2$.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A print head for extruding a cementitious composition, the print head comprising a feed barrel, a print head nozzle, a CO2 supply, a steam supply, a selective valve assembly in communication with the CO2 supply and the steam supply, a plurality of dual use extrusion head injectors, and a print head controller, wherein:
the feed barrel is oriented and shaped to receive the cementitious composition and to direct the cementitious composition to the print head nozzle;
the selective valve assembly communicatively couples the CO2 supply and the steam supply to the dual use extrusion head injectors for selective injection of CO2 and steam from individual ones of the extrusion head injectors;
the plurality of dual use extrusion head injectors are positioned downstream of the print head nozzle for selective injection of CO2 and steam into the cementitious composition extruded from the print head nozzle; and
the print head controller is operatively coupled to the selective valve assembly and is programmed to execute a CO2 and steam injection protocol where steam is exclusively selected for injection by the extrusion head injectors into the cementitious composition as it is extruded from the print head nozzle to enhance a hydration reaction and formation of hydroxide in the cementitious composition before CO2 is exclusively selected for injection by the extrusion head injectors into the cementitious composition as it is extruded from the print head nozzle to enhance a carbonation reaction in the cementitious composition.

2. The print head for extruding a cementitious composition of claim 1, wherein the print head controller is programmed to execute the $CO_2$ and steam injection protocol to establish an alternating and repeating sequence of steam and $CO_2$ injection into the cementitious composition.

3. The print head for extruding a cementitious composition of claim 2, wherein the alternating and repeating sequence of steam and $CO_2$ injection into the cementitious composition comprises periods of steam injection in the sequence that are larger than periods of $CO_2$ injection in the sequence, at approximately equal steam and $CO_2$ flow rates.

4. The print head for extruding a cementitious composition of claim 3, wherein the periods of steam injection are between approximately 3 and approximately 5 times larger than the periods of $CO_2$ injection.

5. The print head for extruding a cementitious composition of claim 4, wherein the periods of steam injection are approximately 2.0 minutes.

6. The print head for extruding a cementitious composition of claim 4, wherein the periods of $CO_2$ injection are approximately 0.5 minutes.

7. The print head for extruding a cementitious composition of claim 3, wherein the periods of steam injection are approximately 2.0 minutes, at a flow rate of approximately 10 ml/min, and the periods of $CO_2$ injection are approximately 0.5 minutes, at a flow rate of approximately 10 ml/min.

8. The print head for extruding a cementitious composition of claim 2, wherein the alternating and repeating sequence of steam and $CO_2$ injection comprises a series of injection-free periods of duration in the alternating and repeating sequence of steam and $CO_2$ injection.

9. The print head for extruding a cementitious composition of claim 8, wherein the duration of individual ones of the injection-free periods is between approximately 0 sec and approximately 20 sec.

10. The print head for extruding a cementitious composition of claim 8, wherein the duration of individual ones of the injection-free periods is less than approximately 10 sec.

11. The print head for extruding a cementitious composition of claim 2, wherein the alternating and repeating sequence of steam and $CO_2$ injection comprises a series of steam injection periods of duration $t_{H2O}$, a series of $CO_2$ injection periods of duration $t_{CO2}$, and a series of injection-free periods of duration $t_0$, satisfying the following relations, at FWHM:

$t_{H2O} \geq t_{CO2} \geq t_0;$ $0\ \text{sec} \leq t_{H2O} \leq 180\ \text{sec};$ $0\ \text{sec} \leq t_{CO2} \leq 60\ \text{sec};\ \text{and}$ $0\ \text{sec} \leq t_0 \leq 20\ \text{sec}.$ 12. The print head for extruding a cementitious composition of claim 3, wherein the periods of steam injection and the periods of $CO_2$ injection are characterized by approximately equal flow rates.

13. The print head for extruding a cementitious composition of claim 2, wherein:
the dual use extrusion head injectors are positioned to selectively inject $CO_2$ and steam into the cementitious composition downstream of the print head nozzle; and
the dual use extrusion head injectors are positioned to selectively inject $CO_2$ and steam into the cementitious composition from positions that at least partially surround an extruded column of cementitious composition.

14. The print head for extruding a cementitious composition of claim 2, wherein the selective valve assembly comprises independent valve assembly components dedicated to respective ones of the $CO_2$ supply and the steam supply, or an integrated valve assembly unit in communication with the $CO_2$ supply and the steam supply.

15. The print head for extruding a cementitious composition of claim 2, wherein the $CO_2$ supply and the steam supply comprise pressurized gas containers, pressurized supply lines, or a combination thereof.

16. A 3D printing architecture comprising a 3D print head positioning framework and the print head of claim 1, wherein the print head is mounted to the 3D positioning framework for 3D movement of the print head nozzle.

17. The 3D printing architecture of claim 16, wherein:
the 3D printing architecture further comprises a source of cementitious material in communication with the feed barrel of the print head; and the extruded cementitious composition and the $CO_2$ and steam injection protocol are configured such that the extruded cementitious composition is self-supporting at NTP.

18. The print head for extruding a cementitious composition of claim 1, further comprising an extrusion head injector cover positioned around the plurality of dual use extrusion head injectors to minimize the loss of $CO_2$ and steam to the atmosphere.

19. The print head for extruding a cementitious composition of claim 18, further comprising a screed bar positioned downstream of the extrusion head injector cover and the print head nozzle to form the cementitious composition.

20. A print head for extruding a cementitious composition, the print head comprising a feed barrel, a print head nozzle, a CO2 supply, a steam supply, a selective valve assembly in communication with the CO2 supply and the steam supply, a plurality of extrusion head injectors, and a print head controller, wherein:
- the feed barrel is oriented and shaped to receive the cementitious composition and to direct the cementitious composition to the print head nozzle;
- the selective valve assembly communicatively couples the CO2 supply and the steam supply to the extrusion head injectors for selective injection of CO2 and steam from the extrusion head injectors;
- the extrusion head injectors are positioned downstream of the print head nozzle for selective injection of CO2 and steam into the cementitious composition extruded from the print head nozzle; and
- the print head controller is operatively coupled to the selective valve assembly and is programmed to execute a CO2 and steam injection protocol where steam is selected for injection by the extrusion head injectors into the cementitious composition as it is extruded from the print head nozzle to enhance a hydration reaction and formation of hydroxide in the cementitious composition before CO2 is selected for injection by the extrusion head injectors into the cementitious composition as it is extruded from the print head nozzle to enhance a carbonation reaction in the cementitious composition.

21. A method of extruding a cementitious composition from a print head comprising a feed barrel, a print head nozzle, a CO2 supply, a steam supply, a selective valve assembly in communication with the CO2 supply and the steam supply, and a plurality of dual use extrusion head injectors, wherein:
- the feed barrel is oriented and shaped to receive the cementitious composition and to direct the cementitious composition to the print head nozzle;
- the selective valve assembly communicatively couples the CO2 supply and the steam supply to the dual use extrusion head injectors for selective injection of CO2 and steam from individual ones of the extrusion head injectors;
- the plurality of dual use extrusion head injectors are positioned downstream of the print head nozzle for selective injection of CO2 and steam into the cementitious composition extruded from the print head nozzle; and
- the method comprises operating the selective valve assembly to select steam for injection by the extrusion head injectors into the cementitious composition as it is extruded from the print head nozzle to enhance a hydration reaction and formation of hydroxide in the cementitious composition, and to subsequently select CO2 for injection by the extrusion head injectors into the cementitious composition as it is extruded from the print head nozzle to enhance a carbonation reaction in the cementitious composition.

* * * * *